Oct. 21, 1952 — G. O. HOFFSTETTER — 2,614,708
CEMENT CONVEYER
Filed Feb. 23, 1951 — 4 Sheets-Sheet 1
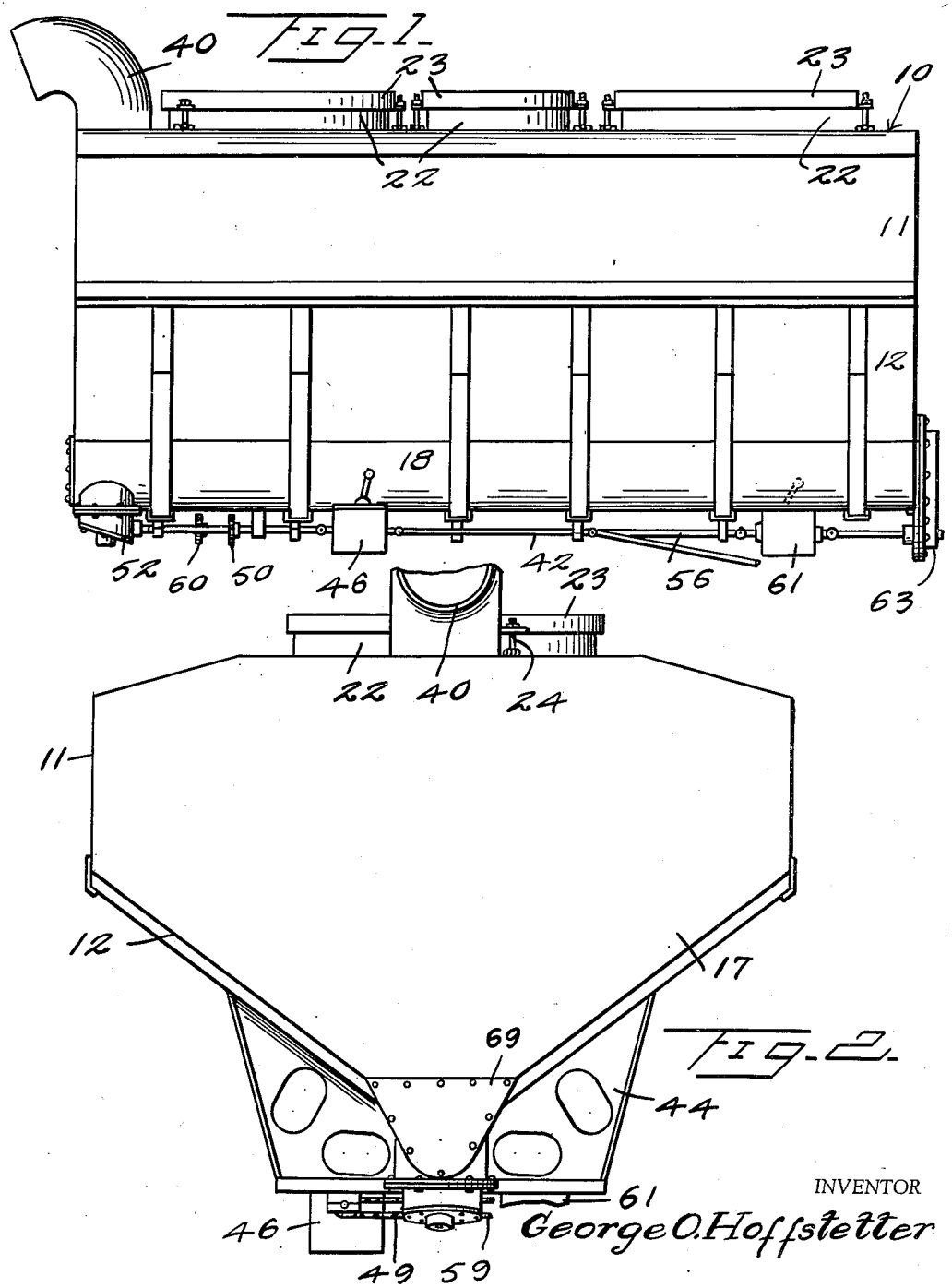
INVENTOR
George O. Hoffstetter
BY Kimmel & Crowell
ATTORNEYS

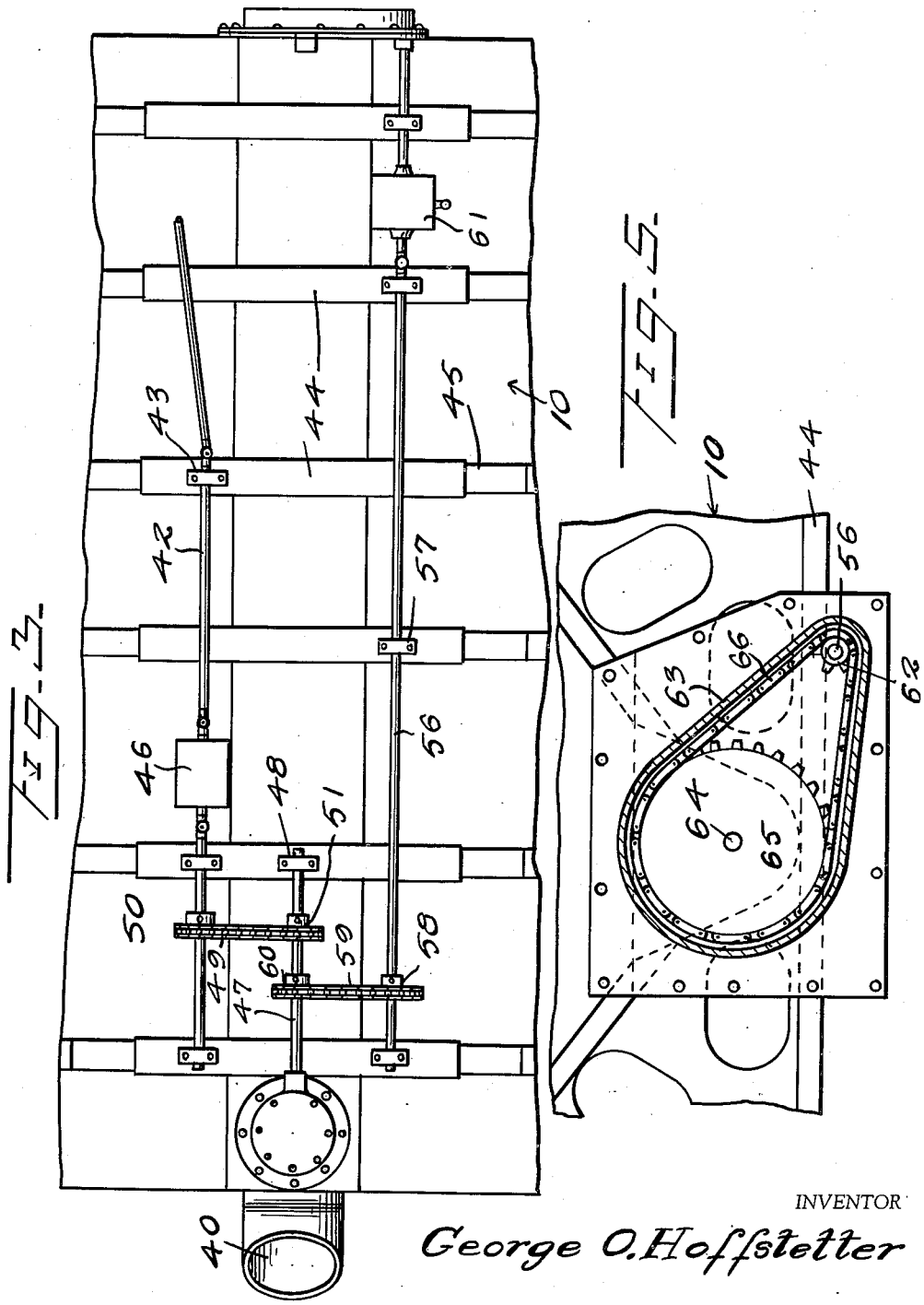

Oct. 21, 1952     G. O. HOFFSTETTER     2,614,708
CEMENT CONVEYER
Filed Feb. 23, 1951     4 Sheets-Sheet 3
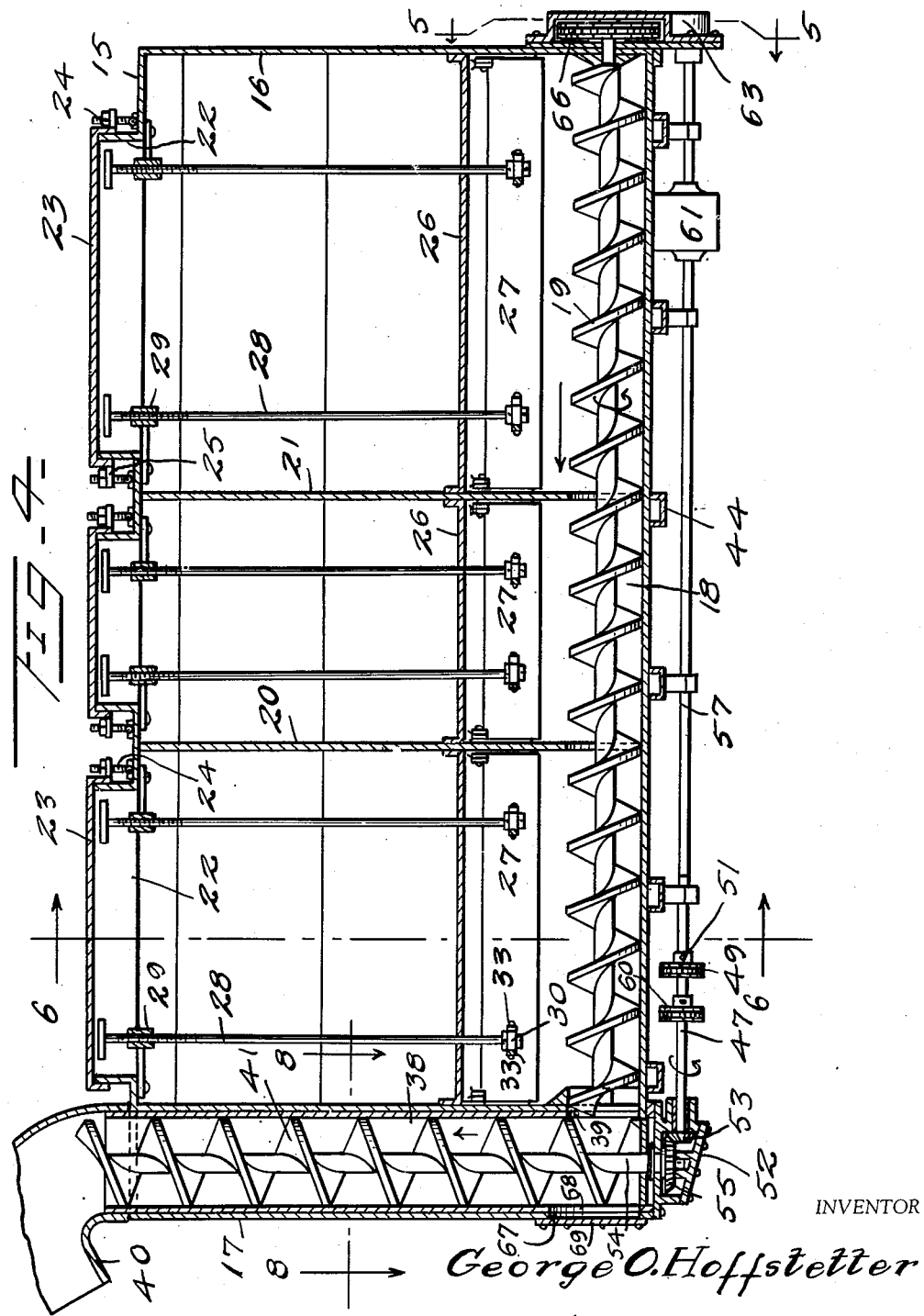
INVENTOR
*George O. Hoffstetter*
BY *Kimmel & Crowell*
ATTORNEYS Oct. 21, 1952 G. O. HOFFSTETTER 2,614,708
CEMENT CONVEYER
Filed Feb. 23, 1951 4 Sheets-Sheet 4
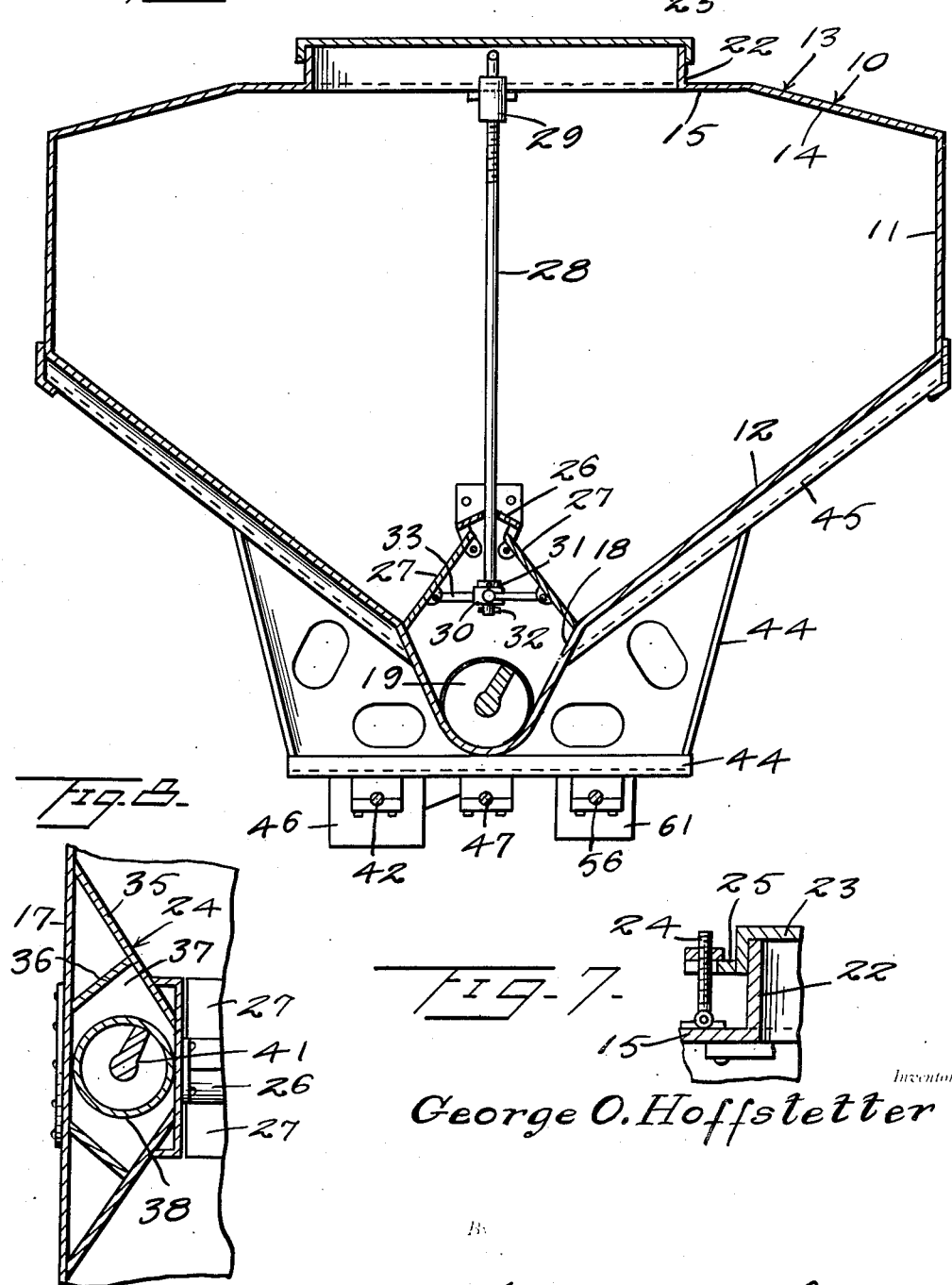
Inventor
George O. Hoffstetter
By
Kimmel & Crowell Attorneys Patented Oct. 21, 1952

2,614,708

UNITED STATES PATENT OFFICE 2,614,708

CEMENT CONVEYER

George O. Hoffstetter, Jerseyville, Ill.

Application February 23, 1951, Serial No. 212,290

2 Claims. (Cl. 214—17)

1

This invention relates to a discharge conveyor for cement or other loose granular material.

An object of this invention is to provide a conveyor embodying a hopper adapted to be mounted on a mobile frame wherein the hopper is provided with a longitudinal screw conveyor in the bottom thereof and an elevator screw at the rear thereof for elevating the material so as to discharge the material into a bin or other receiver.

Another object of this invention is to provide an improved hopper which is divided into compartments with an improved valve means over the longitudinal hopper discharge conveyor so that the material from any selected compartment may be discharged at will.

A further object of this invention is to provide a hopper structure having right angularly related screw conveyors with an improved driving means for the conveyors whereby the conveyors may be operated at the same speed or at speeds different one from the other.

With the above and other objects in view, my invention consists in the arrangement, combination and details of construction disclosed in the drawings and specification, and then more particularly pointed out in the appended claims.

In the drawings:

Figure 1 is a detailed side elevation of a combined hopper and conveyor constructed according to an embodiment of this invention.

Figure 2 is a rear elevation of the device.

Figure 3 is a fragmentary bottom plan of the device.

Figure 4 is a longitudinal section taken vertically through the device.

Figure 5 is a fragmentary sectional view taken on the line 5—5 of Figure 4.

Figure 6 is a sectional view taken on the line 6—6 of Figure 4.

Figure 7 is a fragmentary sectional view showing the cover securing means.

Figure 8 is a fragmentary sectional view taken on the line 8—8 of Figure 4.

Referring to the drawing, the numeral 10 designates generally a hopper which is formed of side walls 11, a V-shaped bottom wall 12 and a top wall 13 which is formed of inclined outer wall members 14 and an inner horizontal wall member 15. The hopper 10 also includes opposite end walls 16 and 17, the latter being the rear wall of the hopper. A substantially V-shaped trough and conveyor housing 18 extends downwardly from the inner edges of the bottom wall members and a screw conveyor 19 is rotatably disposed in the trough 18.

2

The interior of the hopper 10 is divided into a series of compartments by means of inner vertical partition walls 20 and 21. The top wall member 15 has extending upwardly therefrom flanges 22 over which caps or cover members 23 removably engage. The cover members 23 are detachably secured over the flanges 22 by means of pivoted bolts 24 which engage outwardly projecting slotted lugs 25 carried by the depending sides of the cover member 23.

A horizontally disposed V-shaped baffle 26 is secured in the lower portion of each compartment being disposed substantially above the conveyor trough 18. A pair of pivoted valve plates 27 are pivotally secured to the baffle 26 and extend downwardly into the upper portion of the trough 18. The valve plates 27 are adapted to be moved downwardly and inwardly to open position by means of a vertically disposed screw shaft 28 which is threaded through a nut 29 carried by the top wall member 15.

The lower end of the screw shaft 28 rotatably engages through a block 30 and upper and lower collars 31 and 32, respectively, are secured to the shaft 28 above and below the block 30. A pair of oppositely extending links 33 are pivotally secured to the block 30 and to the inner sides of the valve plates 27. When the shaft 28 is moved upwardly the links 33 will pull the valve plates 27 inwardly and downwardly to an open position in order to permit the material in the hopper to be discharged into the conveyor trough or housing 18.

An inner vertically disposed housing generally designated as 34 is disposed at the rear end of the hopper 10 and is formed of a pair of inwardly convergent walls 35 which are braced by means of bracing walls 36. The housing 34 forms a vertically disposed compartment or chamber 37 and a vertically disposed conveyor guide tube 38 is fixedly secured in the chamber 37.

The lower forward portion of the conveyor guide 38 is formed with an opening 39 communicating with the trough 18, and the rear end of the longitudinal hopper discharge conveyor 19. An elbow 40 is adjustably mounted on the upper end of the conveyor guide 39 and provides a means whereby the material elevated in the vertical guide tube by means of a vertically disposed screw conveyor 41 will be discharged from an elevated position at the rear of the hopper 10.

A horizontally disposed drive shaft 42 is journalled in bearings 43 secured to depending bracing plates 44 which are secured to the hopper, being secured at their upper ends to upwardly and outwardly inclined bracing bars 45 which are fixed to the outer sides of the bottom wall members 12. The forward end of the drive shaft 42 is adapted to be connected to a suitable source of power, such a power take-off or other power means and a conventional clutch 46 is interposed in the shaft 42. A centrally disposed elevator shaft 47 is journalled in bearings 48 and is operatively connected with the drive shaft 42 by means of an endless chain 49 engaging over sprockets 50 and 51 secured to the shafts 42 and 47, respectively.

The rear end of shaft 47 extends into a gear housing 52 and has a beveled gear 53 secured thereto. The lower end of the conveyor shaft 54 extends into the gear housing 52 and has a beveled gear 55 secured thereto meshing with gear 53.

A conveyor operating shaft 56 is journalled in bearings 57 carried by the bracing members 44, and the shaft 56 has fixed thereto a sprocket 58 about which a chain 59 engages. The elevator shaft 47 also has fixed thereon a second sprocket 60 about which the chain 59 engages so that shaft 47 will rotate shaft 56. The shaft 56 has interposed therein a transmission or speed changer 61 of conventional construction, and the forward end of shaft 56 as shown in Figure 5 has fixed thereon a sprocket 62 which is positioned within a housing 63. The hopper discharge conveyor 19 includes a shaft 64 and a relatively large sprocket 65 is secured to the forward end of the shaft 64 within the housing 63 and about which a chain 66 engages.

The chain 66 engages about sprockets 62 and 65. The rear wall 17 of the hopper is formed with an opening 67 and the lower end of conveyor guide 38 is also provided with an opening 68 registering with opening 67. A removable plate 69 is secured over the opening 67 so that if desired the material which is moved horizontally and rearwardly by the hopper discharge conveyor 19 may be discharged directly from the lower end of conveyor housing 38 at the time the conveyor 41 is inoperative.

In the use and operation of this device the material such as cement or other loose material is discharged into the compartments formed by the partitions 20 and 21. At the time the material is discharged into the hopper the valve plates 27 will be disposed in the position shown in Figure 6 which is the closed position of the valve plates.

When it is desired to discharge the material from one or more of the compartments the screw shafts 28 are rotated so as to swing the valve plates 27 downwardly and inwardly to an open position. Rotation of the drive shaft 42 will provide for rotation of the hopper discharge conveyor 19 and also provide for rotation of the elevator shaft 47 which rotates the elevator screw conveyor 41. The material elevated by the conveyor 41 will be discharged from the elbow or spout 40, and it will be understood that if desired an extension tube may be connected with the elbow 40 so as to provide for conveying the downwardly moving material to the desired receiver.

Preferably there are two screw shafts 28 for each pair of valve plates 27, and both screw shafts are to be rotated at the same time to provide for the swinging of the valve plates 27 to either open or closed position. The combined hopper and discharge conveying means will permit the discharge of selected amounts of material, and by providing a valve in each compartment the material of a selected compartment may be discharged while the material in the other compartments may be left in the hopper. In this manner the hopper may contain different kinds or grades of material which may be removed or discharged at will from the hopper.

What is claimed is:

1. A material conveyor comprising a hopper body having a pair of downwardly convergent bottom wall members, a plurality of partitions dividing said body into a plurality of compartments, a conveyor housing projecting downwardly of said bottom wall members and disposed longitudinally of said body, a hopper discharge screw conveyor rotatable in said housing, a vertically disposed tubular elevator housing carried by one end of said hopper and having a lower intake opening communicating with said conveyor housing, an elevator screw rotatable in said elevator housing, means rotating said screw conveyor and elevator screw, pairs of valve plates pivotally carried by each compartment in overlying position relative to said conveyor housing, vertically disposed valve plate adjusting members, each including a shaft, a block swively carried by said shaft, links pivotally connected between said block and said plates, and means rotatably securing said shaft in said body, and a delivery member connected with and extending from said elevator housing.

2. A material conveyor comprising a hopper body having a pair of downwardly convergent bottom wall members, a plurality of partitions dividing said body into a plurality of compartments, a conveyor housing projecting downwardly of said bottom wall members and disposed longitudinally of said body, a hopper discharge screw conveyor rotatable in said housing, a vertically disposed tubular elevator housing carried by one end of said hopper and having a lower intake opening communicating with said conveyor housing, an elevator screw rotatable in said elevator housing, means rotating said screw conveyor and elevator screw, an inverted V-shaped member fixed in said hopper above said conveyor housing, a plurality of pairs of valve plates, one pair in each compartment, pivotally carried by said V-shaped member and extending divergently downwardly into said conveyor housing, a block disposed between each pair of said valve plates, links pivotally connected between said block and said plates, a vertically disposed screw shaft swively secured to said block, a nut carried by said hopper body through which said shaft threadedly engages, vertical adjustment of said shaft swinging said valve plates to open or closed position, and a delivery member connected with and extending from said elevator housing.

GEORGE O. HOFFSTETTER.

REFERENCES CITED

The following references are of record in the file of this patent:

UNITED STATES PATENTS

| Number | Name | Date |
| --- | --- | --- |
| 885,730 | Crosby | Apr. 28, 1908 |
| 2,412,121 | Bradshaw | Dec. 3, 1946 |
| 2,438,301 | Schulte | Mar. 23, 1948 |
| 2,439,541 | Hall | Apr. 13, 1948 |